(12) United States Patent
Finn et al.

(10) Patent No.: US 8,713,421 B2
(45) Date of Patent: *Apr. 29, 2014

(54) SCALE INFORMATION FOR DRAWING ANNOTATIONS

(75) Inventors: Brian Samuel Finn, San Rafael, CA (US); Ramakrishna Rao Mummidi, Alameda, CA (US); Phillip Dennis Beymer, Victoria (CA); Tom Ball, Novato, CA (US); John Gilbert Beltran, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 1608 days.

This patent is subject to a terminal disclaimer.

(21) Appl. No.: 11/846,466

(22) Filed: Aug. 28, 2007

(65) Prior Publication Data

US 2009/0063948 A1 Mar. 5, 2009

(51) Int. Cl.
*G06F 17/50* (2006.01)
*G06F 17/21* (2006.01)

(52) U.S. Cl.
USPC ........... 715/211; 715/230; 715/231; 715/273; 715/269; 715/964; 345/660

(58) Field of Classification Search
USPC ................ 715/211, 230, 231, 269, 273, 964; 345/660
See application file for complete search history.

(56) References Cited

U.S. PATENT DOCUMENTS

| | | | | |
|---|---|---|---|---|
| 4,575,813 A * | 3/1986 | Bartlett et al. | ................. | 715/217 |
| 4,849,911 A | 7/1989 | Campian | ..................... | 345/441 |
| 6,683,622 B2 * | 1/2004 | Arsenault | .................... | 345/666 |
| 6,825,860 B1 * | 11/2004 | Hu et al. | ....................... | 715/801 |
| 7,057,628 B2 * | 6/2006 | Crawford et al. | ............ | 345/636 |
| 7,222,306 B2 * | 5/2007 | Kaasila et al. | ................ | 715/801 |
| 7,535,471 B1 * | 5/2009 | Mansfield | ..................... | 345/467 |
| 7,551,187 B2 * | 6/2009 | Agrawala et al. | ............ | 345/667 |
| 2004/0172589 A1 * | 9/2004 | Small | ............................. | 715/502 |
| 2006/0174209 A1 | 8/2006 | Barros | .......................... | 715/764 |
| 2007/0053513 A1 | 3/2007 | Hoffberg et al. | .............. | 380/201 |

OTHER PUBLICATIONS

Finkelstein, "AutoCAD 2008 and AutoCAD LT 2008 Bible", publisher: John Wiley & Sons, published: Jul. 2, 2007, pp. 102-106.*
International Preliminary Report on Patentability for PCT Application No. PCT/US2008/055171, dated Mar. 2, 2010, 6 pages.

(Continued)

*Primary Examiner* — Stephen Hong
*Assistant Examiner* — Wilson Tsui
(74) *Attorney, Agent, or Firm* — Fish & Richardson P.C.

(57) ABSTRACT

The present disclosure includes, among other things, systems, methods and program products for identifying a drawing scale for a graphical view of a drawing, the drawing scale specifying a ratio of two units; selecting one or more annotations associated with the view that support the drawing scale, each of the selected annotations associated with context for the drawing scale, the context specifying one or more of: the annotation's position in the view, the annotation's style in the view, or the annotation's rotation in the view; adding a graphical representation of each of the selected annotations to the view according to the drawing scale and each annotation's respective context; and removing any one or more of the annotations from the view that does not support the drawing scale.

5 Claims, 7 Drawing Sheets

(56) References Cited

OTHER PUBLICATIONS

Do, Ellen Yi-Luen. "The Right Tool at the Right Time—Investigation of Freehand Drawing as an Interface to Knowledge Based Design Tools." PhD Thesis, Technical Report; GIT-GVU-98-34. Georgia Institute of Technology, Published Jul. 1998. [retrieved on Jul. 24, 2008]. 369 pages. Retrieved from the Internet: <URL: ftp://ftp.gvu.gatech.edu/pub/gvu/tr/1998/98-34.pdf>.

International Search Report for PCT Application No. PCT/US2008/55171, dated Jul. 31, 2008, 9 pages.

* cited by examiner

SCALE INFORMATION FOR DRAWING ANNOTATIONS

BACKGROUND

Annotations are used to add helpful information to two dimensional (2D) and three dimensional (3D) computer aided design drawings. Examples of annotations include text labels and hatch patterns. A view is a rectangle or other planar shape that a drawing, or portion thereof, is projected onto and in turn viewed by a user on a display device. A view is of a model space or a paper space (e.g., a preview of a printed drawing plan), and has a scale associated with it that specifies a ratio of units, such as drawing units to paper units. Objects in a drawing are given sizes in terms of units (e.g., inches, feet, centimeters) and appear in the correct proportions depending on a view's scale and space. For example, if a view scale is 1" drawing units to ¼" paper units, a drawing will be rendered as though every inch was a quarter inch in a paper space view. Typically, an annotation is created for a specific view scale. In order for the annotation to appear in the correct proportion at other scales, a version of the annotation needs to be created for each view scale that is desired. This is cumbersome since creating more than one version of an annotation is time consuming, prone to errors, and requires that a change to an annotation be propagated to each version.

SUMMARY

In general, one or more aspects of the subject matter described in this specification can be embodied in one or more methods that include identifying a drawing scale for a graphical view of a drawing, the scale specifying a ratio of two units. One or more annotations associated with the view that support the scale are selected, each of the selected annotations associated with context for the scale, the context specifying one or more of: the annotation's position in the view, the annotation's size in the view, the annotation's style in the view, or the annotation's rotation in the view. A graphical representation of each of the selected annotations is added to the view according to the scale and each annotation's respective context. Any annotation that does not support the scale is removed from the view. Other implementations of this aspect include corresponding systems, apparatus, and computer program products.

These and other implementations can optionally include one or more of the following features. The two units can be paper units and drawing units. The annotation can be one or more of: text, a hatch pattern, a dimension, a leader, a block or a block attribute.

In general, one or more aspects of the subject matter described in this specification can be embodied in one or more methods that include identifying an annotation in a graphical view of a drawing, the annotation having a graphical representation in the drawing and is associated with a plurality of drawing scales, each of the plurality of drawing scales associated with a context where the context and the associated scale determine the graphical representation of an associated annotation in the drawing when the scale matches a view scale. For each scale associated with the annotation: 1) storing in a the file that stores the drawing the scale including storing first units and second units that determine the scale; and 2) storing in the file the associated context including storing one or more of: the annotation's position in the view, the annotation's size in the view, the annotation's style in the view, or the annotation's rotation in the view. Other implementations of this aspect include corresponding systems, apparatus, and computer program products.

These and other implementations can optionally include one or more of the following features. The association between the annotation and the scale can be stored in the file. The association between the scale and the associated context can be stored in the file. The two units can be paper units and drawing units. The annotation can be one or more of: text, a hatch pattern, a dimension, a leader, a block or a block attribute.

In general, one or more aspects of the subject matter described in this specification can be embodied in one or more methods that include identifying an annotation in a graphical view of a drawing, the annotation having a graphical representation in the drawing and associated with a plurality of drawing scales, each of the plurality of drawing scales associated with a context where a context and an associated scale determine the graphical representation of an associated annotation in the drawing when the scale matches a view scale. For each scale associated with the annotation: 1) retrieving from a the file that stores the drawing the scale including storing first units and second units that determine the scale; and 2) retrieving from the file the associated context including storing one or more of: the annotation's position in the view, the annotation's size in the view, the annotation's style in the view, or the annotation's rotation in the view. Other implementations of this aspect include corresponding systems, apparatus, and computer program products.

These and other implementations can optionally include one or more of the following features. The association between the annotation and the scale can be retried from the file. The association between the scale and the associated context can be retrieved from the file. The two units can be paper units and drawing units. The annotation can be one or more of: text, a hatch pattern, a dimension, a leader, a block or a block attribute.

In general, one or more aspects of the subject matter described in this specification can be embodied in a memory for storing data for access by an application program being executed on a data processing system, the memory comprising a data structure stored in said memory, said data structure including: 1) an annotation for a graphical view of a drawing, the annotation having a graphical representation in the drawing; 2) a plurality of drawing scales associated with the annotation, each drawing scale having first and second units that determine the scale; and 3) a context associated with each drawing scale, where a context and an associated scale determine the graphical representation of an associated annotation in the drawing.

These and other implementations can optionally include one or more of the following features. The two units can be paper units and drawing units. The annotation can be one or more of: text, a hatch pattern, a dimension, a leader, a block or a block attribute.

Particular implementations of the subject matter described in this specification can be implemented to realize one or more of the following advantages. Drawing annotations can be rendered in a constant size, regardless of the scale. Annotations are automatically added to or removed from views depending on the current scale of the view and the scale(s) supported by the annotations. Scales are stored in a drawing's file instead of elsewhere on a user's system. A single drawing annotation can appear in different positions for different scales.

The details of one or more implementations of the invention are set forth in the accompanying drawings and the

BRIEF DESCRIPTION OF THE DRAWINGS

Like reference numbers and designations in the various drawings indicate like elements.

DETAILED DESCRIPTION

Figure 1:
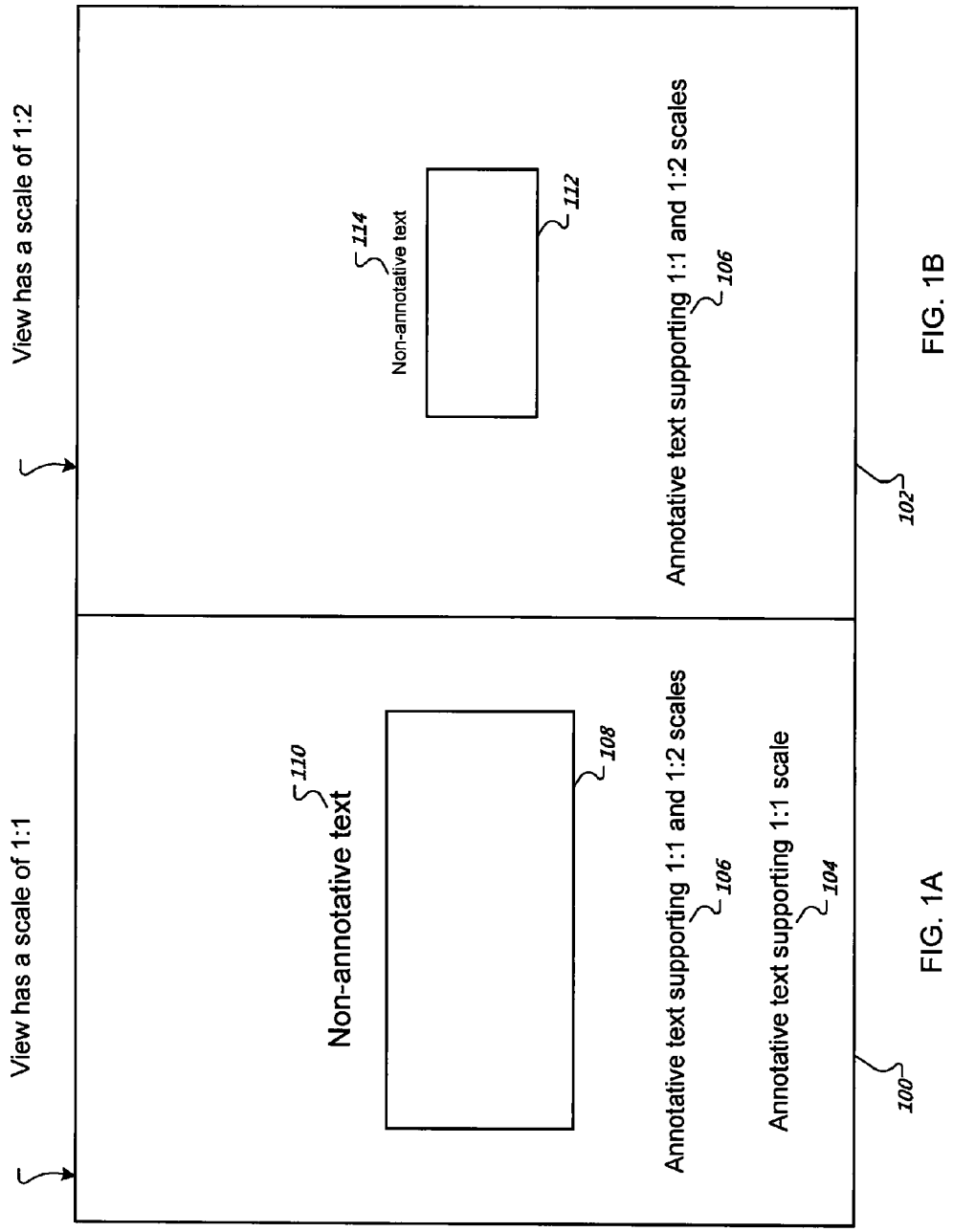
FIGS. 1A and 1B illustrate example annotations shown in views having different scales.

FIGS. 1A and 1B illustrate example annotations shown in views having different scales. An annotation (also known as an annotative entity) is an explanatory item on a drawing, which can be used to label or describe other, non-annotative drawing objects. Annotations can be of several types. For example, annotations can be text, hatch patterns (e.g., shading consisting of multiple crossing lines), dimensions (e.g., a measure of spatial extent, such as a width or height), leaders (e.g., explanatory text with an arrow pointing to the object being described), blocks (e.g., an object, such as a door, which is defined once and referenced multiple times in a drawing) and block attributes (e.g., an attribute of a block, such as a door number, which distinguishes one door block reference from another).

A view 100 in FIG. 1A has a scale of "1:1" (the "1:1" can be read as "one to one"). A scale specifies a ratio between two units. For example, a scale of "1:1" can specify a ratio of one paper unit to one drawing unit. A paper unit can be used to specify the size of a drawing item (such as an annotation) as it appears on paper. A drawing unit can be used to specify the size of an item in model space (e.g., a physical size). A view 102 in FIG. 1B has a scale of "1:2", which specifies a ratio of one paper unit to two drawing units.

The user may desire to control the appearance of annotations. For example, a user may wish to control the size of an annotation, such as showing an annotative text item in a particular size in every view (i.e., keeping the size of a text item constant, even if other items on the drawing appear smaller or larger in views with different scales). As another example, the user may desire the position, rotation or style of an annotation to be different when viewed in different scales (e.g., an annotative text item may fit better at different positions or rotations in views having different scales). As a third example, the user may desire that some annotations appear only in views having particular scales (e.g., showing a certain subset of dimensions in a view with a "1:4" scale and showing a different subset of dimensions in a view having a "1:8" scale).

An annotation can be configured to support particular scales, and an annotation can have associated context settings which control the appearance of the annotation in a view having a particular scale. For example, annotative text items 104 and 106 in view 100 are each configured to support a "1:1" scale. Since the view 100 has a 1:1 scale, the annotative text items 104 and 106 are visible in the view 100. The annotative text item 106 also supports a scale of "1:2", so the annotative text item 106 also appears in the view 102, which has a scale of "1:2". Since the annotative text item 104 does not support the scale of "1:2", it does not appear in the view 102.

If a scale of a view is changed, annotations supporting the new scale appear in the view, and annotations supporting the old, but not the new scale, are automatically hidden from the view. Additionally, for annotations that support both the old and the new scales, but have different context settings for the old and new scales (e.g., different size, style, rotation or position), the annotations can be displayed using the context settings associated with the new scale.

The annotative text item 106 is configured to appear in the same size in both the "1:1" and "1:2" scales. Non-annotative items appear in different sizes in views having different scales. For example, the view 100 includes a rectangle 108 and a non-annotative text item 110. A corresponding rectangle 112 and non-annotative text item 114 appear in the view 102. The rectangle 112 and text item 114 appear smaller than the corresponding rectangle 108 and text item 110 due to the scale difference between the two views (a size difference can also occur if a user performs a zoom command in one of the views).

Figure 2:
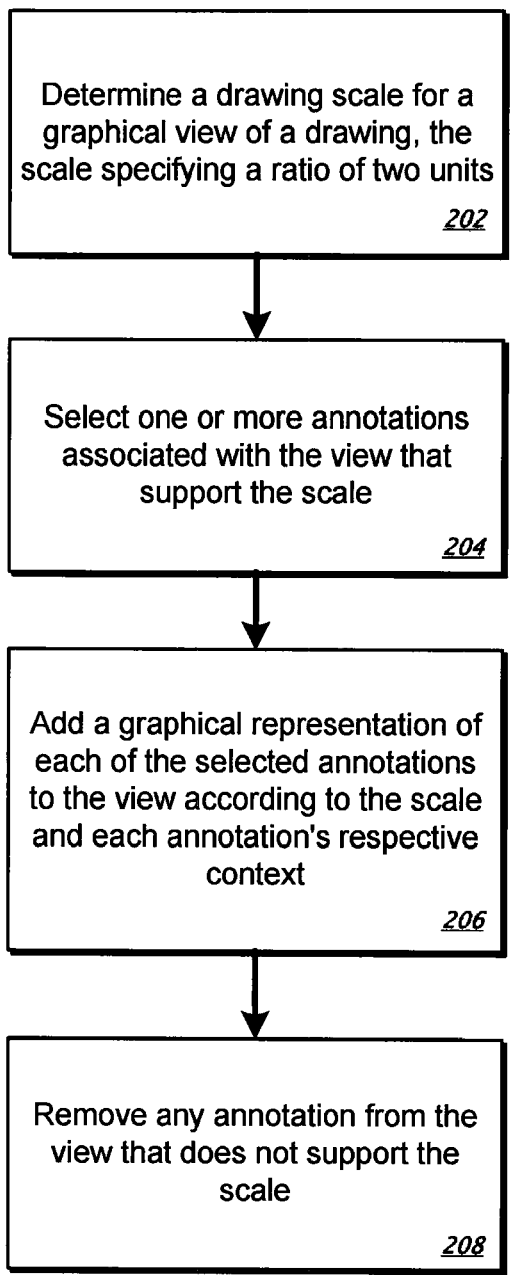
FIG. 2 is a flowchart of a method for updating a graphical view of a drawing.

FIG. 2 is a flowchart of an example method 200 for updating a graphical view of a drawing. A drawing scale for a graphical view of a drawing is determined, where the scale specifies a ratio of two units (step 202). For example, the scale of 1 paper unit to 2 drawing units for the view 102, or the scale of 1 paper unit to 1 drawing unit for the view 100 can be determined. The scale can be determined, for example, when the user changes a scale in a view to a new scale value.

One or more annotations associated with the view that support the scale are then selected (step 204). For example, if scale of "1:1" is determined for the view 100, the annotations 104 and 106, which both support a "1:1" scale, can be selected.

Next, a graphical representation of each of the selected annotations is added to the view according to the scale and each annotation's respective context (step 206). For example, the annotations 104 and 106 can be rendered in the view 100, according to size, style, position and rotation context associated with each annotation and with the "1:1" scale.

Next, any annotations that do not support the scale are removed from the view (step 208). For example, if the annotative text item 104 supported a "1:2" scale but not a "1:1" scale, it could be removed from the view 100.

Figure 3:
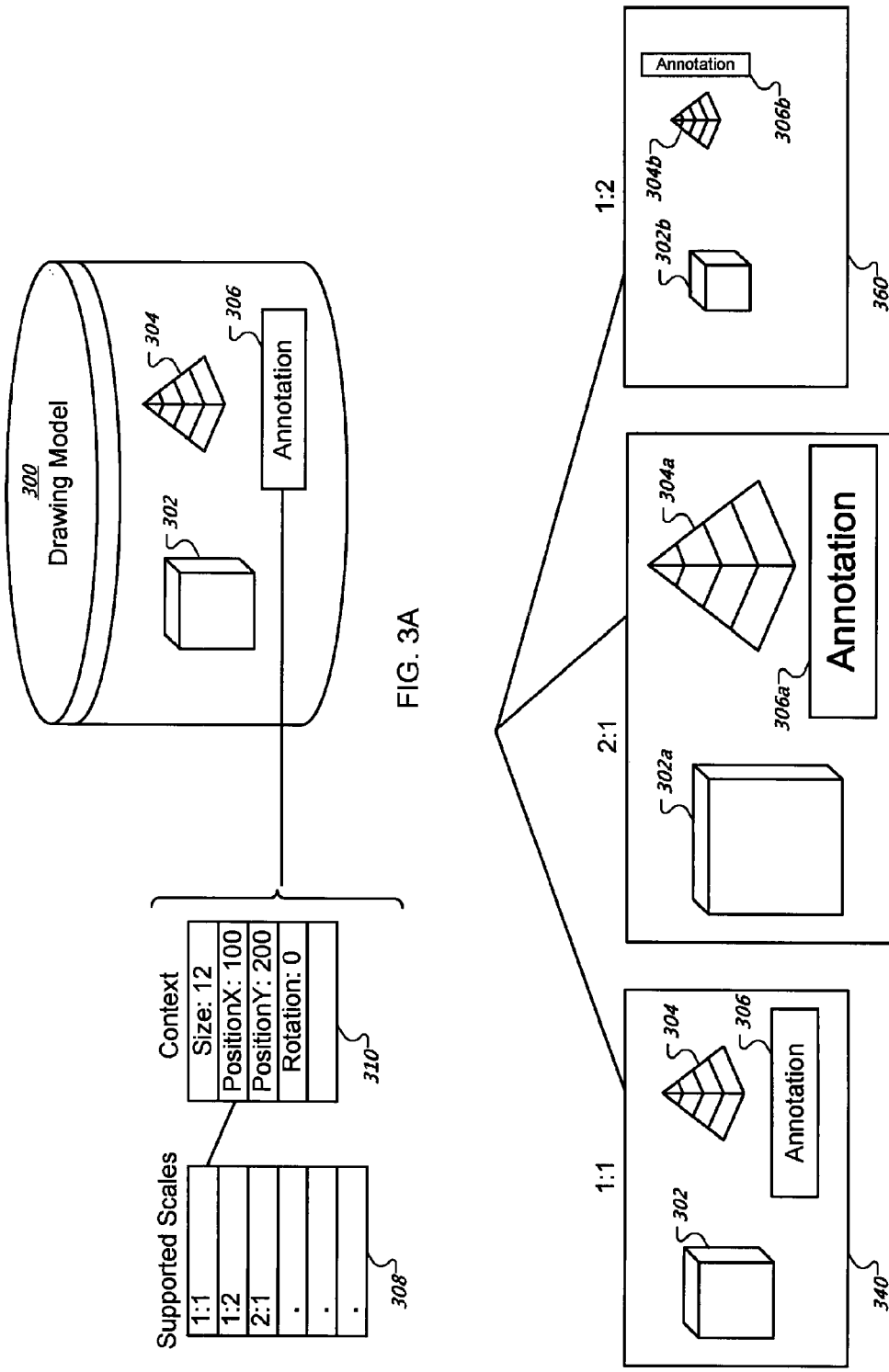
FIG. 3A is an illustration of a data store that includes scale information.
FIG. 3B is an illustration of an example annotation shown in multiple views.

FIG. 3A is an illustration of a data store 300 that includes scale information. The data store 300 stores a drawing model, which includes information associated with non-annotative entities 302 and 304 and an annotative entity (e.g., text) 306. Information stored for the annotative entity 306 includes a list of supported scales 308. The list 308 is a list of view scales (e.g., "1:1", "1:2", "2:1") that the annotative entity 306 supports. Information stored for the annotative entity 306 also includes, for each supported scale, context associated with the scale. For example, for the scale "1:1", associated context settings 310 include size, position and rotation values (i.e., when viewed in the scale "1:1", the annotative entity 306 can be displayed according to the context settings 310). In some implementations, the supported scales 308 and associated context settings 310 can be stored using key-value data structures.

FIG. 3B is an illustration of an example annotation shown in multiple views having differing scales. As described above, a list 308 of supported scales is stored for the annotative entity 306 in the drawing model 300, and for each supported scale, a set of context settings 310 can be stored. A view 340 displays the non-annotative entities 302 and 304, along with the annotative entity 306, using a "1:1" scale. The annotative entity 306 is shown according to context settings 310 associated with the scale used in the view 340 (i.e., associated with a "1:1" scale).

A view 350 has a scale of "2:1", and entities 302a, 304a, and 306a are shown in a larger size as compared to the corresponding entities 302, 304, and 306 in the view 340. The annotative entity 306a is shown according to context settings associated with the "2:1" scale. A view 360 has a scale of "1:2", and entities 302b, 304b, and 306b are shown in a smaller size as compared to the corresponding entities 302, 304, and 306 in the view 340. The annotative entity 306b is shown according to context settings associated with the "1:2" scale. In addition, the annotative entity 306b is shown with a different rotation than the corresponding annotative entity 306. As mentioned above, an annotative entity can have context settings associated with a scale that can control the appearance of the annotative entity when displayed in a view using that particular scale.

Figure 4:
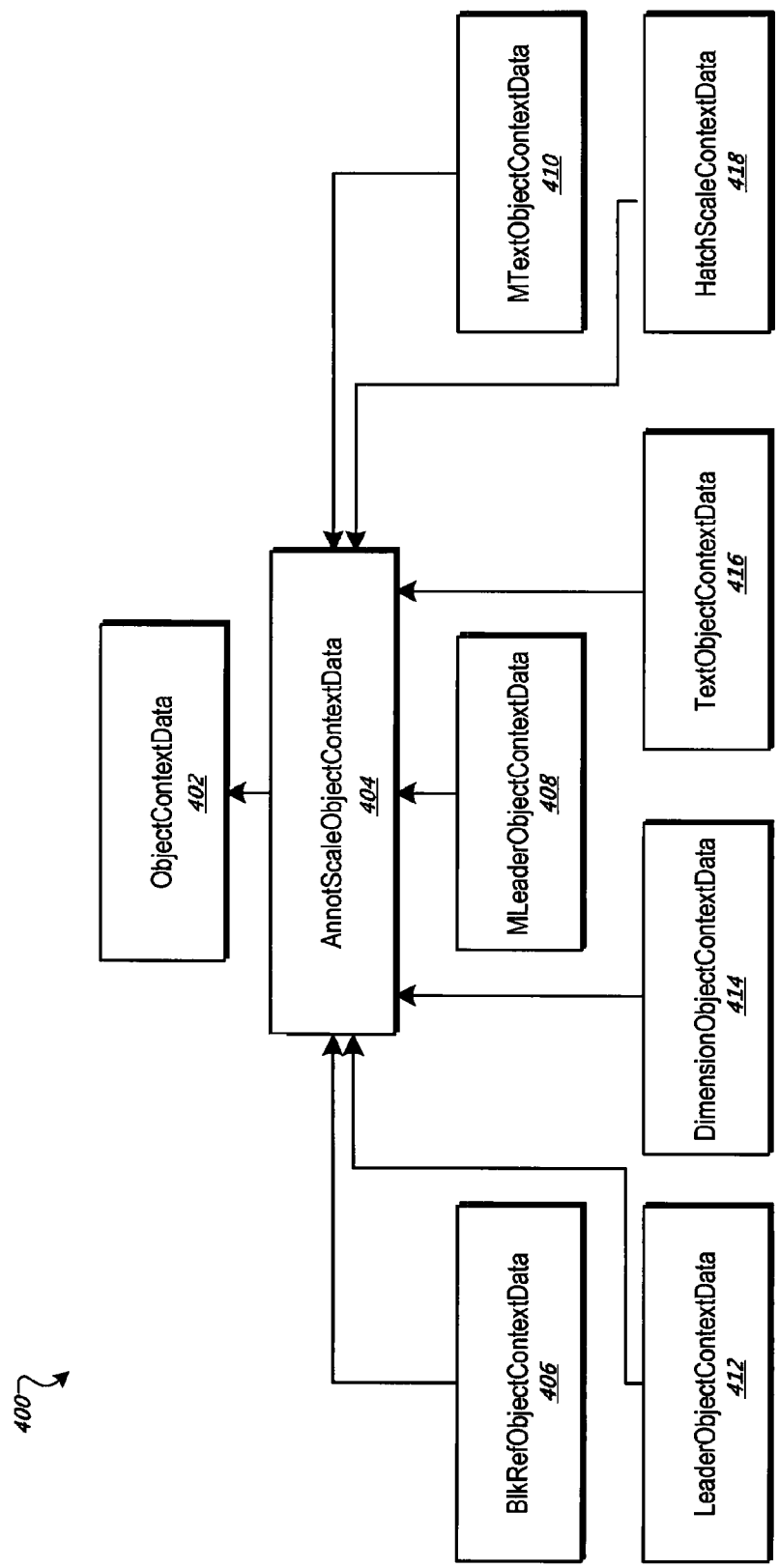
FIG. 4 illustrates an example class hierarchy for storing context data associated with scales.

FIG. 4 illustrates an example class hierarchy 400 for storing context data associated with scales. A class represents an object type. The class hierarchy 400 shows multiple classes representing multiple annotation object types. A class can define context information that is stored on a per scale basis for a particular annotation type. Base classes ObjectContextData 402 and AnnotScaleObjectContextData 404 define information that is stored for all types of annotation objects. Objects of the ObjectContextData class 402 can store a data version and a boolean value indicating whether the context data stored is the default context data for the annotation. Objects of the AnnotScaleObjectContextData class 404 can store an identifier associated with a scale object that the context data is associated with.

Objects of the BlkRefObjectContextData class 406 can store context information associated with block reference annotations, such as the rotation, position and scale factors for the block reference.

Objects of the MLeaderObjectContextData class 408 can store context information associated with "multiple leader" (MLeader) objects, such as the number of leader lines stored, whether the MLeader has an associated multiple-line text item, the number of characters in the multiple-line text item, and the content, location, direction vector, rotation, line-spacing factor, width and height of the multiple-line text item. For each column of the multiple-line text item, a column height and a boolean value indicating whether to use word break for the content can be stored.

Objects of the MTextObjectContextData class 410 can store context information associated with multiple-line annotative text objects, such as an attachment point, a direction vector, a location point, a width and height of the multiple-line text area, whether columns are associated with the multiple-line text area, the number of columns, and for each column, a column width and an auto height flag.

Objects of the LeaderObjectContextData class 412 can store context information associated with leader objects, such as the number of vertices in the leader, the vertex point location for each vertex, a horizontal direction, a boolean value indicating whether the leader "hook line" is in the same direction as the horizontal direction for the leader, an offset between the last leader vertex and the leader's block insertion location, and an annotation offset for the leader.

Objects of the DimensionObjectContextData class 414 can store context information associated with dimension objects. Dimension context information can vary based on the type of dimension object. For each dimension object, a location, rotation and arrow orientation can be stored. For angular dimension objects, an arc point of the angular dimension can be stored. For aligned dimension objects, a dimension line point specifying the location of the dimension line can be stored. For radial dimension objects, a chord point specifying the point where the dimension line intersects the curve being dimensioned can be stored. For diametric dimension objects, a chord point specifying where the dimension line intersects the curve being dimensioned (and extends outside the curve, if the text is outside the curve) can be stored. Also for diametric dimension objects, a far chord point can be stored. A far chord point is the point on the curve being dimensioned that is diametrically opposite the point where the dimension line extends outside the curve, if the text is outside the curve. For ordinate dimension objects, an origin point defining a reference point for distance calculations can be stored, along with an endpoint specifying the dimension leader's endpoint.

Objects of the TextObjectContextData class 416 can store context information associated with annotative text objects, such as a horizontal mode, a rotation value, a position value and an alignment point.

Objects of the HatchScaleContextData class 418 can store context information associated with hatch annotative objects, such as the number of hatch pattern lines, and for each line in the hatch pattern, a line angle, a base position value of the line, a horizontal offset direction of the line, a vertical offset direction of the line, and the number of dashes in the line. Also, a dash length, a hatch pattern base angle (used for paper orientation) and the number of boundary loops in the hatch can be stored. For each boundary loop in the hatch, a value indicating the type of the boundary loop can be stored, as well as a boolean flag indicating whether the boundary loop has bulges, a boolean value indicating whether the boundary loop is closed, the number of points in the boundary loop, and number of edges in the boundary loop.

For each edge of the hatch object, an edge type can be stored indicating whether the edge is a line, circular arc, elliptical arc, or spline. For line edges, starting and ending points of the boundary loop edge can be stored. For circular arc edges, a center point, radius, start angle, end angle and boolean value indicating whether the circular arc is measured clockwise can be stored. For elliptical arc edges, a center point, major axis, radius ratio specifying the ratio of the minor radius divided by major radius, start angle, end angle and a boolean value indicating whether the elliptical arc is measured clockwise can be stored. For spline edges, the degree of the spline boundary loop edge, a boolean value indicating whether the spline edge is rational, a boolean value indicating whether the spline edge is periodic, and the number of control points in the spline edge can be stored.

Figure 5:
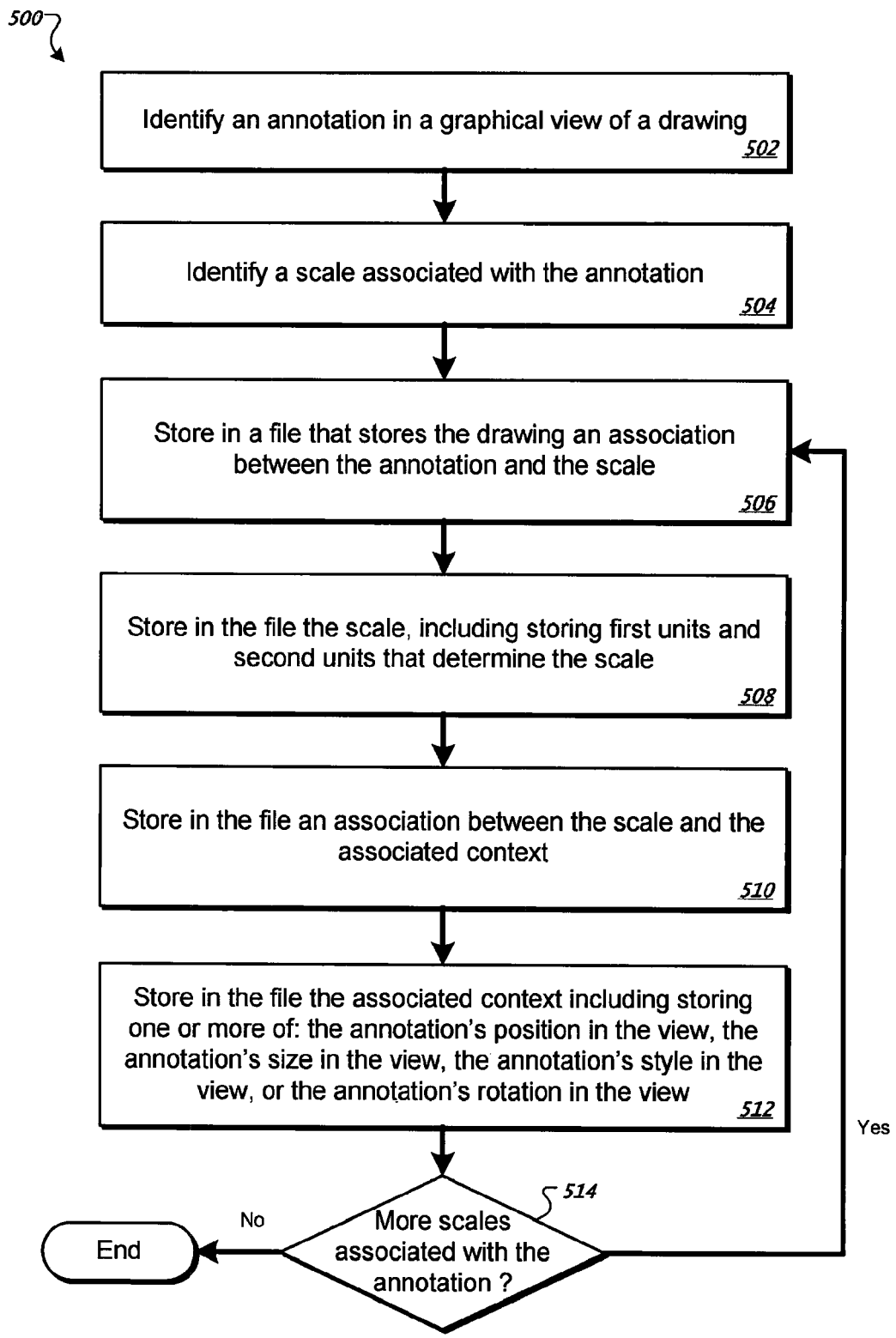
FIG. 5 is a flowchart of a method for storing a drawing's annotation scale information.

FIG. 5 is a flowchart of an example method 500 for storing a drawing's annotation scale information. First, an annotation in a graphical view of a drawing is identified (step 502). For example, the annotative entity 306 in the view 340 can be identified.

A scale associated with the annotation is then identified (step 504). For example, the "1:1" scale supported by the annotative entity 306 and used in the view 340 can be identified.

An association between the annotation and the scale is then stored in a file that stores the drawing (step 506). For example, an association between the annotative entity 306 and the scale "1:1" can be stored in a file that stores the drawing model 300. The scale value of "1:1" can be included in the supported scales list 310, and the supported scales list 310 can be associated with the annotative entity 306, for example, by using a key-value data structure.

Next, the scale, including first units and second units that determine the scale, is stored in the file (step 508). For example, the supported scales list 308, which includes a supported scale value of "1:1" (which specifies a ratio of 1 paper units to 1 drawing units) can be stored in a file which stores the drawing model 300.

An association between the scale and the associated context is then stored in the file (step 510). For example, an entry in the supported scales list 308 corresponding to a "1:1" scale value can be associated with context setting 310, for example, by using a key-value data structure, and the key-value data structure can be stored in a file that stores the drawing model 300. The associated context is then stored in the file, including storing one or more of: the annotation's position in the view, the annotation's size in the view, the annotation's style in the view, and the annotation's rotation in the view (step 512). For example, the context settings 310, which include values for the annotative entity 306's size, position and rotation, can be stored in a file that stores the drawing model 300.

It is then determined whether more scales are associated with the annotation (step 514). If there are no more scales associated with the annotation, the method ends. If there are more scales associated with the annotation, an association between the annotation and the scale is stored in the file (step 506), and steps 508 to 514 are performed. For example, it can be determined that, in addition to a "1:1" scale, the annotative entity 306 is associated with a second scale of "1:2", as indicated by the contents of the supported scales list 308.

Figure 6:
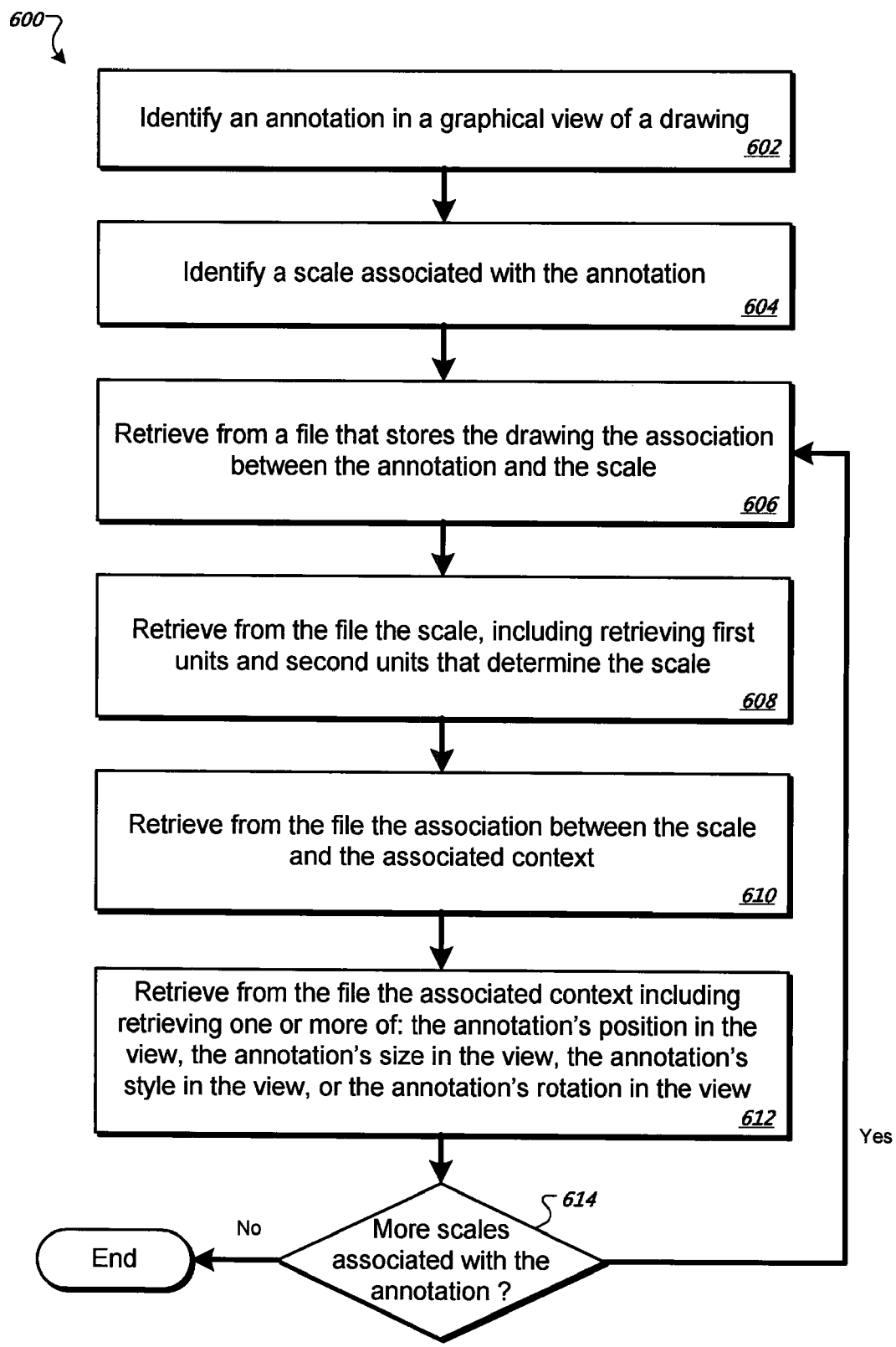
FIG. 6 is a flowchart of a method for retrieving a drawing's annotation scale information.

FIG. 6 is a flowchart of an example method 600 for retrieving a drawing's annotation scale information. First, an annotation in a graphical view of a drawing is identified (step 602). For example, the annotative entity 306 in the view 340 can be identified. A scale is then associated with the annotation is identified (step 604). For example, the "1:1" scale supported by the annotative entity 306 and used in the view 340 can be identified.

An association between the annotation and the scale is then retrieved from a file that stores the drawing (step 606). For example, an association between the supported scales list 308 and the annotative entity 306 can be retrieved, for example, from a key-value data structure that is stored in a file that stores the drawing model 300.

Next, the scale, including first units and second units that determine the scale, is retrieved from the file (step 608). For example, the supported scales list 308 can be retrieved from a file that stores the drawing model 300, and the scale value of "1:1" can be read from the supported scales list 308 and converted to a ratio of 1 paper unit to 1 drawing unit.

An association between the scale and the associated context is then retrieved from the file (step 610). For example, an association between a scale value of "1:1" and the context settings 310 can be retrieved from a file that stores the drawing model 300, for example, by retrieving a key-value data structure.

The associated context is then retrieved from the file, including retrieving one or more of: the annotation's position in the view, the annotation's size in the view, the annotation's style in the view, and the annotation's rotation in the view (step 612). For example, the context settings 310 can be retrieved from a file that stores the drawing model 300, and position, size and rotation values can be retrieved from the context settings 310.

Next, it is determined whether more scales are associated with the annotation (step 614). If there are no more scales associated with the annotation, the method ends. If there are more scales associated with the annotation, an association between the annotation and the scale is retrieved from the file (step 606), and steps 608 to 614 are performed. For example, it can be determined that there are additional scales (e.g., "1:2") in the retrieved supported scales list 308.

Figure 7:
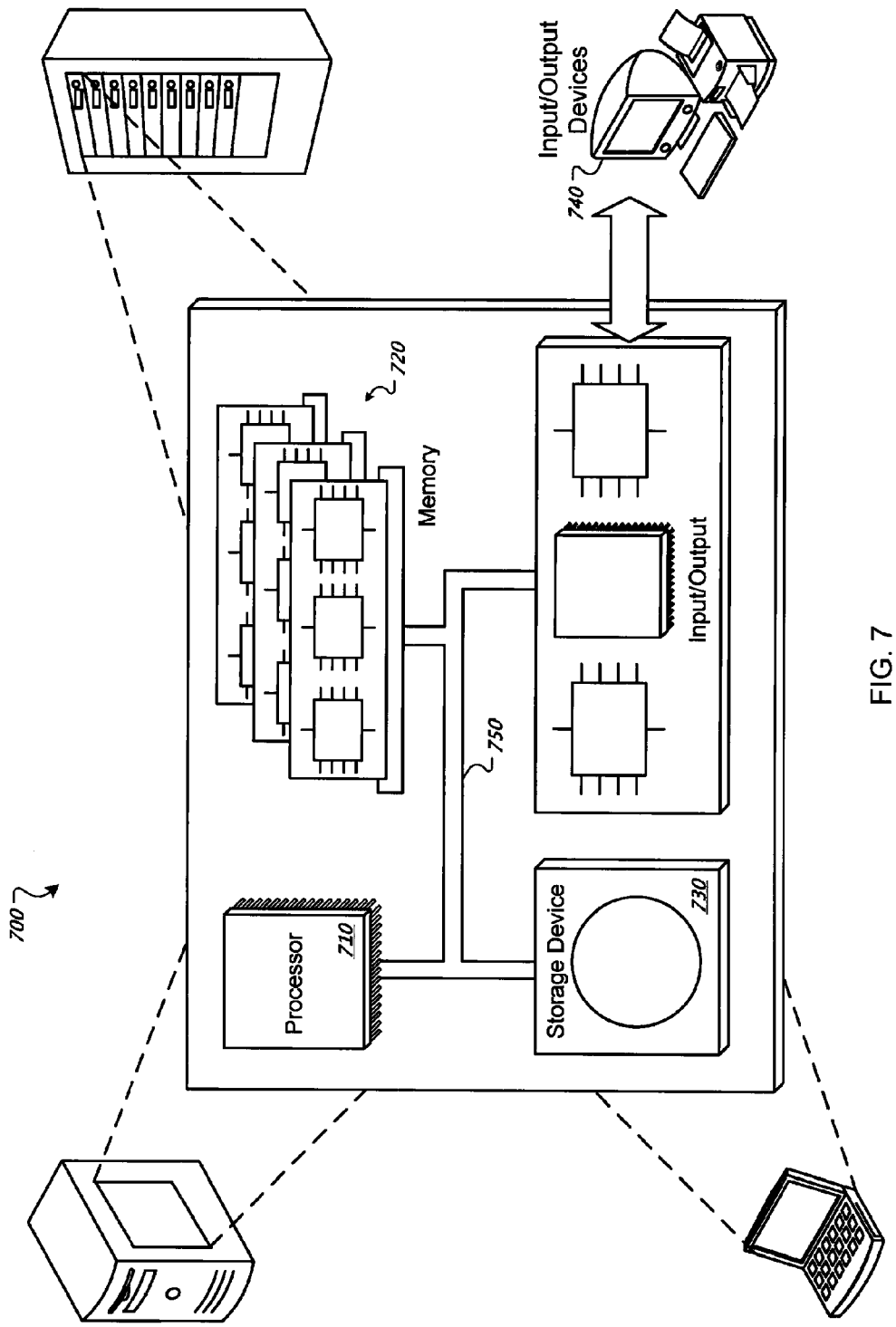
FIG. 7 is a schematic diagram of a generic computer system.

FIG. 7 is a schematic diagram of a generic computer system 700. The system 700 can be used for practicing operations described in association with the techniques 200, 500 and 600. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 is a computer readable medium such as volatile or non volatile that stores information within the system 700. The memory 720 could store data structures representing annotations, annotation scales, and associated context, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

The input/output device 740 can provide input/output operations for a CAD system. The CAD system can be, for example, AutoCad®, Autodesk Architectural Desktop® or Autodesk Building Systems®, available from Autodesk, Inc., of San Rafael, Calif., or another CAD application or other software application. The CAD system can include computer software components that annotation scales. Such software components can be persisted in storage device 730, memory 720 or can be obtained over a network connection, to name a few examples.

A CAD drawing does not necessarily correspond to a file. A drawing may be stored in a portion of a file that holds other content, in a single file dedicated to the drawing in question, or in multiple coordinated files. Moreover, a drawing can be stored in a memory without having first been stored in a file.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, the method comprising:
- identifying a drawing scale for a graphical view of a drawing from a file that stores the drawing, the drawing scale specifying a ratio of two units;
- selecting one or more annotations associated with the view that supports the drawing scale;
- retrieving from the file for each of the selected annotations, associated context for the drawing scale, the context specifying one or more of: the annotation's position in the view, the annotation's style in the view, or the annotation's rotation in the view;
- adding a graphical representation of each of the selected annotations to the view according to the drawing scale and each annotation's respective context;
- and removing any one or more of the annotations from the view that does not support the drawing scale.

2. The method of claim 1 where the two units are paper units and drawing units.

3. The method of claim 1 where the annotation is one or more of: text, a hatch pattern, a dimension, a leader, a block or a block attribute.

4. A system comprising:
- a display for presenting a view of a drawing to a user; and
- one or more computing devices operable to interact with the display and to perform operations comprising:
    - identifying a drawing scale for a graphical view of a drawing from a file that stores the drawing, the drawing scale specifying a ratio of two units;
    - selecting one or more annotations associated with the view that supports the drawing scale;
    - retrieving from the file for each of the selected annotations, associated context for the drawing scale, the context specifying one or more of: the annotation's position in the view, the annotation's style in the view, or the annotation's rotation in the view;
    - adding a graphical representation of each of the selected annotations to the view according to the drawing scale and each annotation's respective context;
    - and removing one or more of the annotations from the view that does not support the drawing scale.

5. A computer program product, encoded on a non-transitory medium storage device, operable to cause data processing apparatus to perform operations comprising:
- identifying a drawing scale for a graphical view of a drawing from a file that stores the drawing, the drawing scale specifying a ratio of two units;
- selecting one or more annotations associated with the view that support the drawing scale; retrieving from the file for each of the selected annotations, associated context for the drawing scale, the context specifying one or more of: the annotation's position in the view, the annotation's style in the view, or the annotation's rotation in the view;
- adding a graphical representation of each of the selected annotations to the view according to the drawing scale and each annotation's respective context; and
- removing one or more of the annotations from the view that does not support the drawing scale.

* * * * *